United States Patent [19]

Yamamoto et al.

[11] Patent Number: 5,329,124
[45] Date of Patent: Jul. 12, 1994

[54] RADIATION DETECTOR

[75] Inventors: Seiichi Yamamoto; Tsunekazu Matsuyama, both of Kyoto, Japan

[73] Assignee: Shimadzu Corporation, Kyoto, Japan

[21] Appl. No.: 9,117

[22] Filed: Jan. 26, 1993

[30] Foreign Application Priority Data

Mar. 31, 1992 [JP] Japan .................................. 4-108972

[51] Int. Cl.$^5$ ............................................. G01T 1/202
[52] U.S. Cl. ..................................... 250/367; 250/366
[58] Field of Search ................................ 250/367, 366

[56] References Cited

U.S. PATENT DOCUMENTS 5,091,650 2/1992 Uchida et al. ...................... 250/366

Primary Examiner—Constantine Hannaher
Attorney, Agent, or Firm—Heller, Ehrman, White & McAuliffe

[57] ABSTRACT

A radiation detector has a larger plural number of scintillators arranged closely and two-dimensionally together and a smaller plural number of photomultiplier tubes optically connected to this scintillator group. Specified regions on mutually opposite surfaces of these scintillators are covered with an optically reflective material and the areas covered by this reflective material vary according to the order in which these scintillators are arranged.

18 Claims, 3 Drawing Sheets

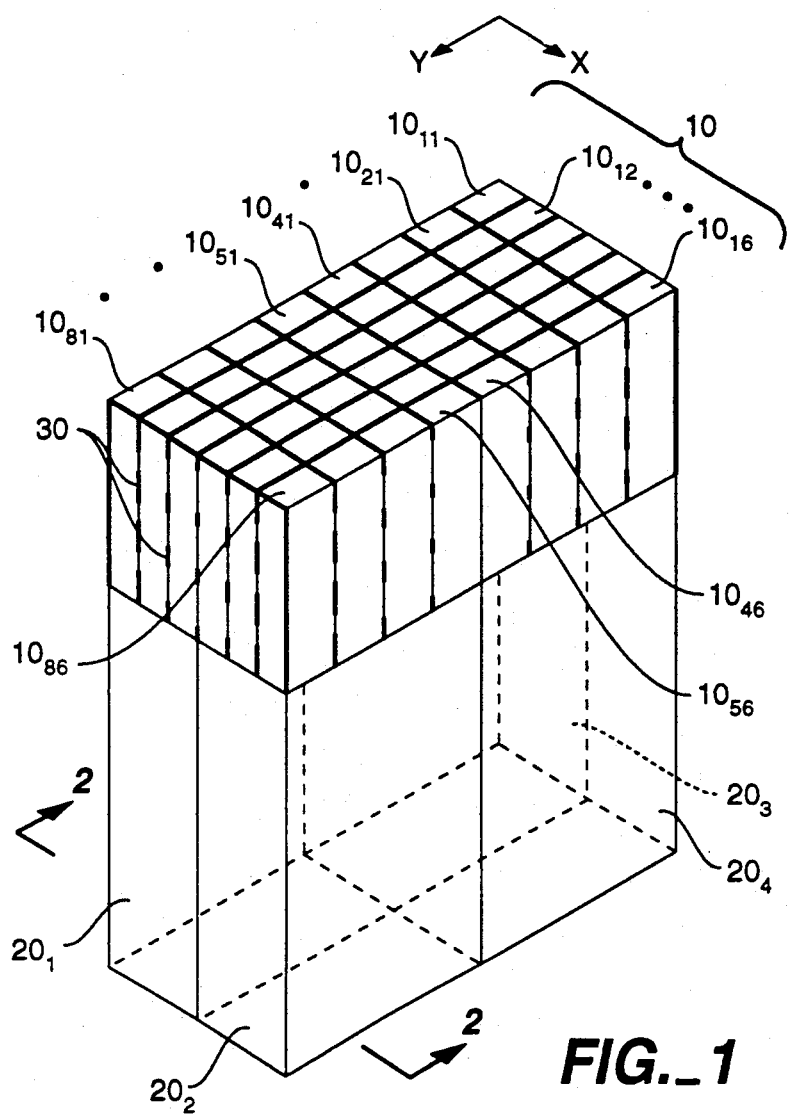
FIG._1
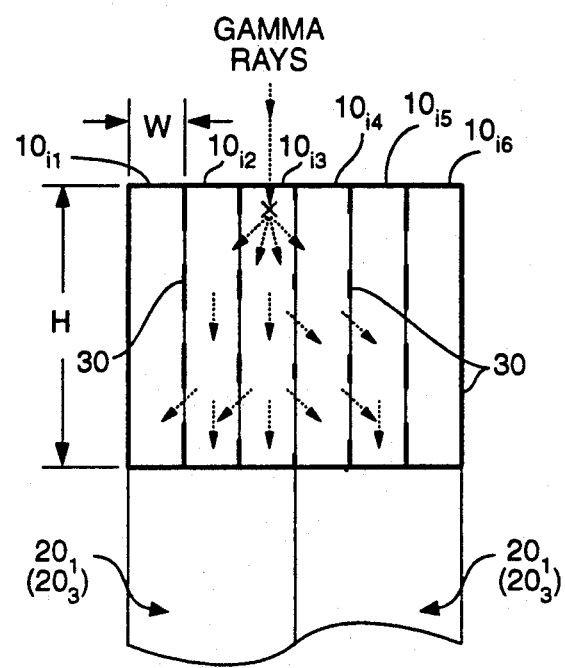
FIG._2

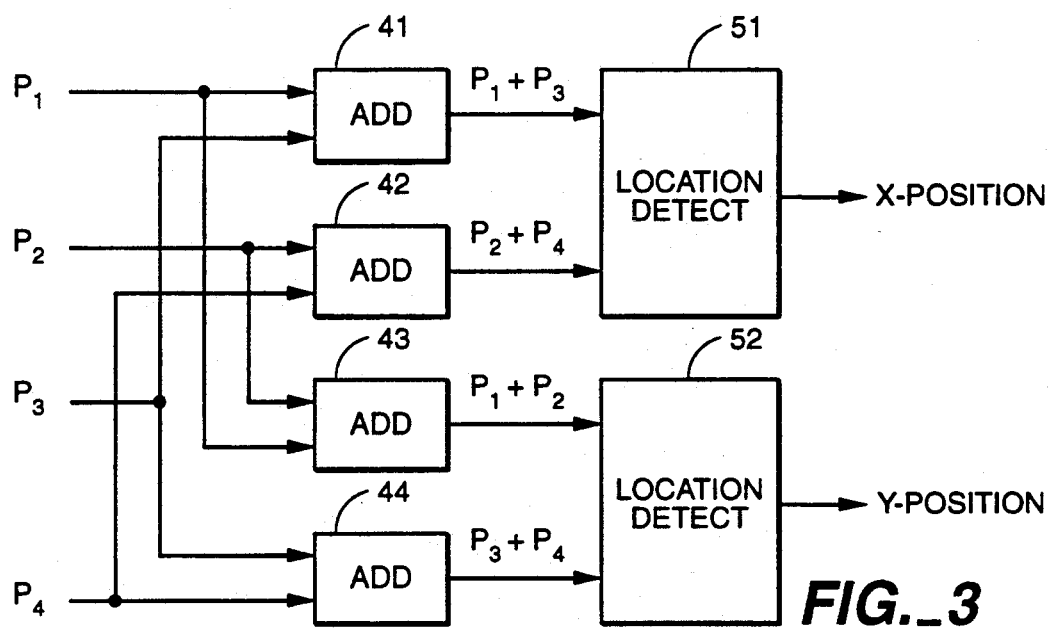
FIG._3
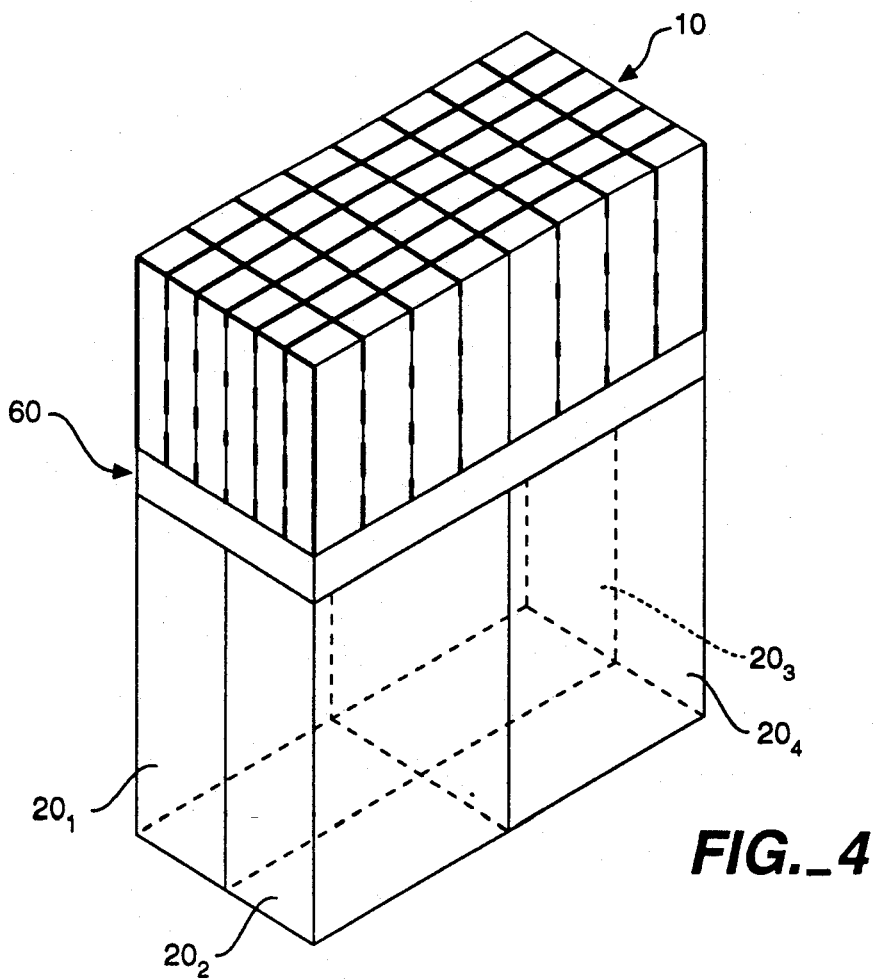
FIG._4

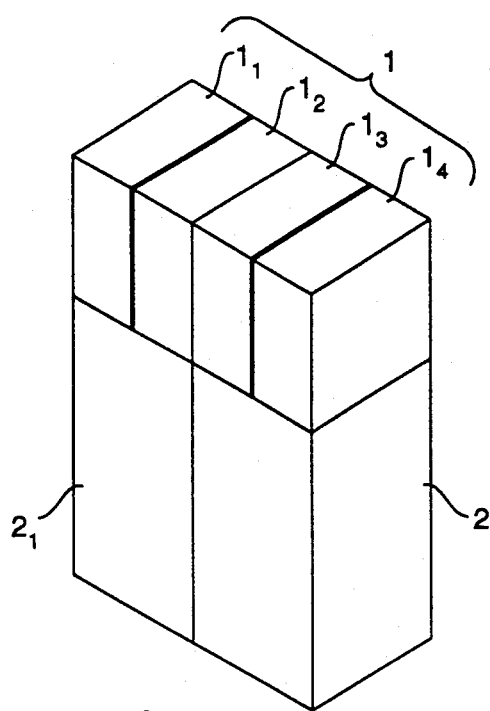
FIG._5
*(PRIOR ART)*
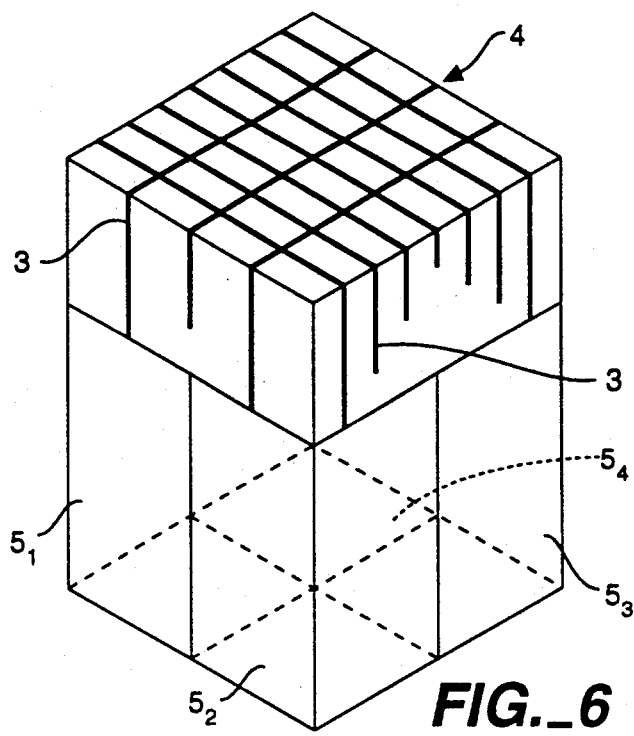
FIG._6
*(PRIOR ART)*
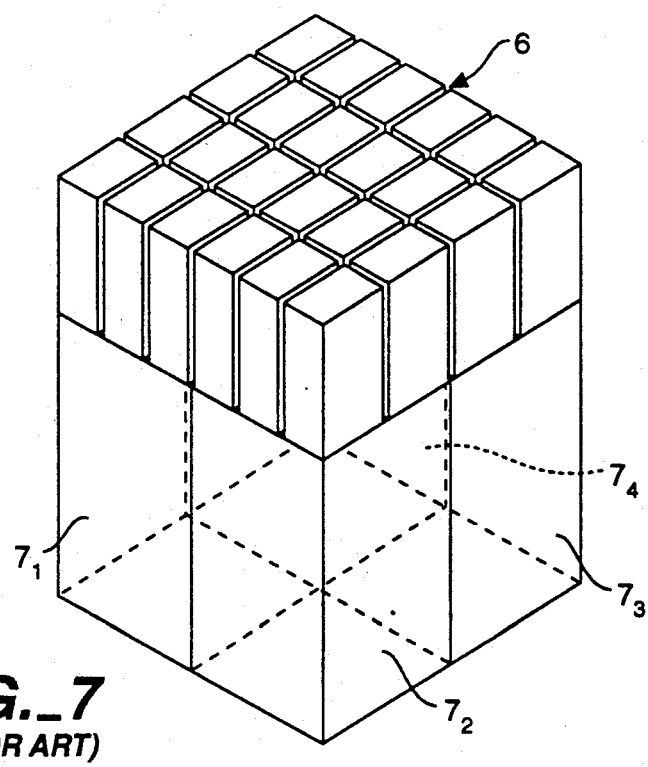
FIG._7
*(PRIOR ART)*

RADIATION DETECTOR

BACKGROUND OF THE INVENTION

This invention relates to a radiation detector for use in an apparatus, such as a positron type CT (computed tomography) apparatus or a single photon type ECT (emission computed tomography) apparatus, for detecting radiation (such as gamma rays) emitted from a radiative isotope (RI) administered to an object body and accumulated at a target location of interest to thereby obtain tomographic images of the RI distribution at the target location.

A radiation detector of this type is comprised of scintillators which emit light by absorbing gamma rays from an object body and photomultiplier tubes for converting light from the scintillators into electrical pulse signals. In prior art radiation detectors of this type, scintillators and photomultiplier tubes were provided in mutually corresponding one-to-one relationship. According to a recent method for improving resolution, however, a plurality of scintillators are coupled with a smaller number of photomultiplier tubes and the locations of incident gamma rays are determined from the output ratios of these photomultiplier tubes. For this reason, many types of radiation detectors have been proposed for properly distributing emitted light from scintillators among a plurality of photomultiplier tubes. The structure of some prior art radiation detectors will be explained next with reference to the drawings.

As shown in FIG. 5, a first example of prior art radiation detector (as described in Japanese Patent Publication Tokko 2-14666) is comprised of a scintillator group 1 with four scintillators $1_1$, $1_2$, $1_3$ and $1_4$ and two photomultiplier tubes $2_1$ and $2_2$. The two inside scintillators $1_2$ and $1_3$ of the scintillator group 1 are optically connected at their boundary with silicone grease or the like, but a reflective material is provided at the boundary between the pair of outside scintillators $1_1$ and $1_2$ and also between the pair of outside scintillators $1_3$ and $1_4$ such that each scintillator of the pairs is optically screened from the other and that the ratio of outputs from the photomultiplier tubes $2_1$ and $2_2$ will vary according to the location of incident gamma rays.

FIG. 6 shows a second example of prior art radiation detector (as described in Japanese Patent Publication Tokko 62-500957) comprised of a scintillator group 4 partitioned by many slits 3 and four photomultiplier tubes $5_1$, $5_2$, $5_3$ and $5_4$ optically connected to this scintillator group 4. A reflective material is buried inside each slit, and the slits near the peripheries of the scintillator group 4 are made deeper than those near the center such that locations of incident gamma rays can be distinguished.

FIG. 7 shows a third example of prior art radiation detector (as described in Japanese Patent Publication Tokkai 3-185385) comprised of a scintillator group 6 having a plurality of scintillators and four photomultiplier tubes $7_1$, $7_2$, $7_3$ and $7_4$ connected to this scintillator group 6. The surfaces of these scintillators through which they are optically connected are made rough and/or mirror-like and air layers are formed between these connecting surfaces. With this radiation detector, the locations of incident gamma rays can be distinguished because the optical transmissivity between the scintillators varies according to the surface conditions of the mutually opposite scintillators.

Each of the prior art radiation detectors described above has a problem. In the detector of the first example, since the scintillators are arranged one-dimensionally against the photomultiplier tubes, the number of photomultiplier tubes is rather large compared to that of the scintillators, resulting in an increased cost of production of the detector. Another problem of this detector is low resolution because only four different locations of incident gamma rays can be distinguished by using two photomultiplier tubes. As for the second example, the work on the scintillators to make slits therein and to uniformly fill them with a reflective material is both troublesome and difficult. If high resolution is desired, the slits must be provided at a small pitch and this makes the scintillators easy to damage. With the third example, the surface conditions of the scintillators must be varied in different ways, but such a surface processing is complicated and the production cost of the detector will be adversely affected.

The present invention has been accomplished in view of these problems, and its object is to provide a radiation detector which is both capable of identifying the locations of incident radiation with high resolution and easy to manufacture.

SUMMARY OF THE INVENTION

A radiation detector according to the present invention, with which the above and other objects can be accomplished, is comprised of a larger plural number of scintillators arranged closely and two-dimensionally together and a smaller plural number of photomultiplier tubes optically connected to this scintillator group, and is characterized wherein specified regions on mutually opposite surfaces of these scintillators are covered with an optically reflective material and the areas covered by this reflective material vary according to the order in which these scintillators are arranged.

When there is an incidence of gamma rays in one of the plurality of scintillators closely and two-dimensionally arranged in a radiation detector thus structured, this scintillator absorbs the radiation and emits light. The emitted light is dispersed through the scintillator and enters the adjacent scintillators through portions of their boundary surfaces not covered with any reflective material, further becoming dispersed and entering neighboring scintillators. Since the areas of the boundary surfaces covered with a reflective material are varied according to the order of arrangement of the scintillators, however, the amount of light entering the neighboring scintillators also depends on the position of the scintillator which absorbs the incident radiation. Consequently, the output ratio from the photomultiplier tubes optically connected to the scintillator group will vary according to the location of incident radiation.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a perspective view of a radiation detector according to a first embodiment of the invention;

FIG. 2 is a sectional view taken along the line 2—2 in FIG. 1;

FIG. 3 is a block diagram of a location detector;

FIG. 4 is a perspective view of another radiation detector according to a second embodiment of the invention;

FIG. 5 is a perspective view of a prior art radiation detector;

FIG. 6 is a perspective view of another prior art radiation detector; and

FIG. 7 is a perspective view of still another prior art radiation detector.

DETAILED DESCRIPTION OF THE INVENTION

FIGS. 1 and 2 show a radiation detector embodying the present invention, comprised of a scintillator group 10 with a total of 48 scintillators closely and two-dimensionally arranged in a matrix-like formation with six of them in each row in the X-direction and eight of them in each column in the Y-direction, and four photomultiplier tubes $20_1$, $20_2$, $20_3$ and $20_4$ optically connected to this scintillator group 10. Inorganic crystals, for example, of $Bi_4Ge_3O_{12}$ (BGO), $Gd_2SiO_5$ (GSO), NaI, $BaF_2$ and CsF may be used as the scintillators. Members 30 of an optically reflective material cover specified portions of the boundary surfaces of mutually opposite pairs of the scintillators such that these covered portions are substantially evenly distributed over each mutually opposite pair and the areas of these covered portions vary according to the order of arrangement of the scintillators, increasing towards the edges and decreasing towards the center of the matrix-like formation monotonically. The reflective members 30 may comprise barium sulfate, magnesium oxide or aluminum.

Consider for example the six scintillators $10_{i1}$–$10_{i6}$ (i being a dummy variable 1–8) aligned in the X-direction. The ratio between the area covered by a reflective member 30 and the area not so covered on each boundary surface between opposite ones of these scintillators is experimentally determined such that the output ratio between the photomultiplier tube $20_1$ ($20_3$) and the photomultiplier tube $20_2$ ($20_4$) aligned in the X-direction will vary at a constant rate. According to one embodiment of the invention, the ratio between covered and uncovered areas was determined such that $(P_1-P_2)/(P_1+P_2)$ would vary at a fixed rate according to the positions of the scintillators $10_{i1}$–$10_{i6}$, where $P_1$ and $P_2$ are respectively the outputs from the photomultiplier tubes $20_1$ and $20_2$.

The ratio between the areas covered and not covered by a reflective member 30 varies according to the width W and the height H of the scintillators. Where the width W was 3.7 mm and the height H was 30 mm, for example, an appropriate choice for the ratio of covered portion to the entire area of the opposing surfaces of the scintillators, as shown in FIG. 2, was 90–100% between the scintillators $10_{i1}$ and $10_{i2}$, 30–40% between the scintillators $10_{i2}$ and $10_{i3}$, 0–5% between the scintillators $10_{i3}$ and $10_{i4}$, 30–40% between the scintillators $10_{i4}$ and $10_{i5}$, and 90–100% between the scintillators $10_{i5}$ and $10_{i6}$.

For the eight scintillators $10_{1j}$–$10_{8j}$ (j being a dummy variable 1–6) aligned in the Y-direction, appropriate portions of their mutually opposite surfaces are similarly covered with a reflective member 30 such that the output ratio from the photomultiplier tube $20_1$ ($20_2$) and the photomultiplier tube $20_3$ ($20_4$) will vary at a constant rate.

The invention does not limit the method of applying the reflective member 30 over specified areas on the mutually opposite surfaces of the scintillators. Such boundary surfaces can be produced easily, for example, by mixing barium sulfate powder with a binder of synthetic resin to prepare a reflective paint, placing a mask over the scintillator surface with openings at specified positions, spraying the reflective paint thereover and drying it thereafter. For the instant embodiment, reflective members 30 of thickness 0.1–0.2 mm were made by using barium sulfate. If aluminum is used as the reflective material, the members 30 may be formed by vapor deposition.

The external surfaces of the scintillators are covered with reflective members 30 as shown in FIG. 2 except where they are optically connected to the photomultiplier tubes. In FIG. 1, however, these reflective members on the external surfaces are not shown for the convenience of illustration.

The function of the embodiment described above will be explained next with reference to FIG. 2. Suppose, for example, that there was an incidence of gamma-ray radiation in the scintillator $10_{i3}$. The radiation causes light to be emitted as it is absorbed inside this scintillator $10_{i3}$. The emitted light is reflected many times by the reflective members 30 applied onto the scintillator $10_{i3}$ as it is guided to the photomultiplier tube $20_1$. In the meantime, a portion of the light inside the scintillator $10_{i3}$ propagates into the neighboring scintillators $10_{i2}$ and $10_{i4}$ through the portions of the boundary surfaces not covered with a reflective material 30. Since the boundary surface between the scintillators $10_{i3}$ and $10_{i4}$ has a larger portion not covered with a reflective material than the boundary surface between the scintillators $10_{i2}$ and $10_{i3}$, the light inside the scintillator $10_{i3}$ propagates more into the scintillator $10_{i4}$ and a significant amount of light is also directed to the photoelectric surface of the photomultiplier tube $20_2$. As a result, amounts of light representing a distribution corresponding to the location of incident radiation are directed to the individual photomultiplier tubes $20_1$ and $20_2$. If the incidence of gamma rays is into the end scintillator $10_{i1}$, on the other hand, almost all emitted light will be directed to the photomultiplier tube $20_1$ because only a very small portion of the boundary surface between the scintillators $10_{i1}$ and $10_{i2}$ is not covered with the reflective material 30.

FIG. 3 is a block diagram for showing the structure of a location detector for detecting the location of incident gamma rays on the basis of outputs from the photomultiplier tubes $20_1$–$20_4$. As shown in FIG. 3, outputs $P_1$ and $P_3$ respectively from the photomultiplier tubes $20_1$ and $20_3$ are inputted into an adder 41 and outputs $P_2$ and $P_4$ respectively from the photomultiplier tubes $20_2$ and $20_4$ are inputted into another adder 42 in order to determine the location of incident gamma rays in the X-direction. Adder outputs $P_1+P_3$ and $P_2+P_4$ respectively from the adders 41 and 42 are inputted into a location detecting circuit 51, which determines the location of the incident gamma rays in the X-direction from the ratio of these two adder outputs. Similarly, outputs $P_1$ and $P_2$ respectively from the photomultiplier tubes $20_1$ and $20_2$ are inputted into an adder 43 and outputs $P_3$ and $P_4$ respectively from the photomultiplier tubes $20_3$ and $20_4$ are inputted into another adder 44 in order to determine the location of incident gamma rays in the Y-direction. Adder outputs $P_1+P_2$ and $P_3+P_4$ respectively from the adders 43 and 44 are inputted into another location detecting circuit 52, which determines the location of the incident gamma rays in the Y-direction from the ratio of these two adder outputs.

If the light inside the scintillator group 10 is directly guided into the photomultiplier tubes $20_1$–$20_4$ as explained above, any local unevenness in the photoelectric surfaces can cause a variation in the relationship between the amount of incident light and the outputs from the photomultiplier tubes $20_1$–$20_4$, reducing the detection accuracy of location of incident gamma rays. In such a situation, the light inside the scintillator group 10 may be guided into the photomultiplier tubes $20_1$–$20_4$ as shown in FIG. 4 through a light guide 60 made, for example, of a transparent acryl resin plate. If such a light guide 60 is used, incident light onto each photoelectric surface is scattered such that local unevenness thereon can be reduced and the detection accuracy of location of incident gamma rays can be improved.

Although the invention was explained above by way of an example of a radiation detector with 48 scintillators and four photomultiplier tubes, this example is not intended to limit the scope of the invention. It goes without saying that the numbers of scintillators and photomultiplier tubes can be arbitrarily selected.

Although not clearly shown in the figures, furthermore, each of the scintillators $10_{ij}$ may be preliminarily provided with indented sections corresponding to the regions to be covered with the reflective members 30. The depth of such indented sections is equal to the thickness of the reflective members 30 and, when the scintillator group 10 is formed, these indented sections are filled with corresponding ones of the reflective members 30 before the scintillators are assembled. In this manner, mutually adjacent pairs of the scintillators can be in direct face-to-face contact with each other and the scintillator group 10 can be formed without any layer of air between the individual scintillators, thereby improving the accuracy of detection.

In summary, locations of incident gamma rays can be determined with high accuracy according to the present invention. Moreover, the process of applying a reflective material on mutually opposite surfaces of scintillators is much easier than the prior art production methods of forming slits in a scintillator and filling them with a reflective material or making the surfaces of scintillators rough or smooth. Thus, radiation detectors according to the present invention can be produced at a lower cost.

What is claimed is:

1. In a radiation detector comprising a larger plural number of scintillators arranged closely and two-dimensionally together and a smaller plural number of photomultiplier tubes optically connected to said scintillators, the improvement wherein an optically reflective material is deposited directly upon and firmly attached to a plurality of specified mutually separated regions distributed evenly throughout on mutually opposite boundary surfaces between mutually adjacent pairs of said scintillators and the total of areas on said boundary surfaces covered by said reflective material varies according to the order in which said scintillators are arranged.

2. The radiation detector of claim 1 further comprising a light-dispersing means sandwiched between said scintillators and said photomultiplier tubes.

3. The radiation detector of claim 2 wherein said light-dispersing means includes a transparent acryl resin plate.

4. The radiation detector of claim 1 wherein said scintillators are arranged in a two-dimensional matrix formation with at least six rows and at least six columns.

5. The radiation detector of claim 4 wherein the total area covered by said reflective material on said boundary surfaces increases monotonically from central to peripheral parts of said matrix.

6. The radiation detector of claim 1 wherein said optically reflective material comprises barium sulfate.

7. The radiation detector of claim 6 wherein said optically reflective material has thickness of 0.1–0.2 mm.

8. The radiation detector of claim 1 wherein said optically reflective material comprises barium sulfate powder mixed with a binder of synthetic resin.

9. The radiation detector of claim 8 wherein said optically reflective material is sprayed on said regions and dried.

10. The radiation detector of claim 1 wherein said optically reflective material forms vapor deposited layers.

11. The radiation detector of claim 1 wherein said optically reflective material comprises aluminum.

12. In a radiation detector comprising a larger plural number of mutually adjacent scintillators arranged closely together in a two-dimensional matrix formation with at least six rows and at least six columns and a smaller plural number of photomultiplier tubes optically connected to said scintillators, the improvement wherein mutually adjacent pairs of said scintillators are in direct face-to-face contact with each other over specified regions on mutually opposite surfaces, indentations are formed at a plurality of specified other mutually separated regions distributed evenly throughout on the mutually opposite surfaces of mutually adjacent pairs of said scintillators, said indentations are completely filled with an optically reflective material comprising barium sulfate powder mixed with a binder of synthetic resin, no air gap is left between mutually adjacent pairs of said scintillators, and the total of areas between a mutually adjacent pair of scintillators covered by said reflective material varies according to the order in which said scintillators are arranged, increasing monotonically from central to peripheral positions in said matrix.

13. The radiation detector of claim 12 wherein said optically reflective material is 0.1–0.2 mm thick in said indentations.

14. In a radiation detector comprising a larger plural number of scintillators arranged closely together in a two-dimensional matrix formation with rows and columns and a smaller plural number of photomultiplier tubes optically connected to said scintillators, the improvement wherein an optically reflective material comprising barium sulfate powder mixed with a binder of synthetic resin is deposited directly upon and firmly attached to a plurality of specified mutually separated regions distributed evenly throughout on mutually opposite boundary surfaces of said scintillators and the total of areas on each of said boundary surfaces covered by said reflective material varies according to the order in which said scintillators are arranged, increasing monotonically from central to peripheral positions of said matrix.

15. The radiation detector of claim 14 wherein said optically reflective material is sprayed on said regions and dried.

16. The radiation detector of claim 14 further comprising a light-dispersing means sandwiched between said scintillators and said photomultiplier tubes.

17. The radiation detector of claim 16 wherein said light-dispersing means includes a transparent acryl resin plate.

18. The radiation detector of claim 14 wherein said matrix formation includes at least six rows and six columns.

* * * * *